US011349860B2

(12) United States Patent
Soryal

(10) Patent No.: US 11,349,860 B2
(45) Date of Patent: May 31, 2022

(54) MALICIOUS SOFTWARE DETECTION AND MITIGATION

(71) Applicant: AT&T Intellectual Property I, L.P., Atlanta, GA (US)

(72) Inventor: Joseph Soryal, Ridgewood, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 70 days.

(21) Appl. No.: 16/877,616

(22) Filed: May 19, 2020

(65) Prior Publication Data

US 2021/0367959 A1 Nov. 25, 2021

(51) Int. Cl.
*H04L 29/06* (2006.01)
*H04L 9/40* (2022.01)
*G06F 21/56* (2013.01)
*G06F 21/60* (2013.01)

(52) U.S. Cl.
CPC .......... *H04L 63/1425* (2013.01); *G06F 21/56* (2013.01); *G06F 21/604* (2013.01); *H04L 63/1466* (2013.01)

(58) Field of Classification Search
CPC ........................ H04L 63/1425; H04L 63/1466; H04L 63/604
See application file for complete search history.

(56) References Cited

U.S. PATENT DOCUMENTS

| 7,917,491 | B1* | 3/2011 | Sack | G06Q 30/02 |
| | | | | 707/708 |
| 10,599,834 | B1* | 3/2020 | Stoletny | G06Q 30/0277 |
| 2008/0148106 | A1* | 6/2008 | Chow | G06Q 30/0185 |
| | | | | 714/49 |
| 2008/0320125 | A1* | 12/2008 | O'Sullivan | G06Q 30/0241 |
| | | | | 709/224 |
| 2016/0042388 | A1* | 2/2016 | Chater | G06Q 30/0246 |
| | | | | 705/14.45 |
| 2016/0080405 | A1* | 3/2016 | Schler | H04L 63/1425 |
| | | | | 726/23 |
| 2019/0057009 | A1* | 2/2019 | Wang | G06F 21/10 |

OTHER PUBLICATIONS

Shannon Liao, "Google bans app developer with 600 million downloads for being a fake click factory," The Verge, Apr. 26, 2019.

* cited by examiner

*Primary Examiner* — Vance M Little

(57) ABSTRACT

An example method includes obtaining, by a processor on an end user device, from an operating system of the end user device, a permission to access the operating system by a malicious software management application, receiving, by the processor via the malicious software management application from the operating system, a first set of click information indicative of a set of clicks detected by an input-output interface of the end user device and a second set of click information indicative of a set of clicks detected by a web browser of the end user device, identifying, by the processor via the malicious software management application based on the first and second sets of click information, a presence of a click generating application on the end user device, and initiating, by the processor via the malicious software management application based on the presence of the click generating application, a mitigation action.

20 Claims, 3 Drawing Sheets

MALICIOUS SOFTWARE DETECTION AND MITIGATION

The present disclosure relates generally to communication systems, and more particularly to methods, computer-readable media, and apparatuses for supporting detection and mitigation of malicious software on end user devices associated with communication systems.

BACKGROUND

End users devices typically include applications which enable end users to perform various tasks. For example, end user devices may include word processing applications, email applications, web browsing applications, and the like. End user devices, however, also may be subject to malicious activities, such as when malicious applications are downloaded onto the end user devices without the knowledge of the end users. For example, one type of malicious application is an ad-click application, which may attempt to generate ad-click revenue based on generation of fake ad-clicks in the background of the end user device. This type of malicious activity, if not detected and mitigated, may cause various problems for the end user of the end user device, such as by consuming resources of the end user device and, thus, negatively impacting the user experience of the end user.

SUMMARY

In one example, the present disclosure describes methods, computer-readable media, and apparatuses for supporting detection and mitigation of malicious software, such as click generating software, running on an end user device. In one example, a method is performed by a processor on an end user device. The method includes obtaining, by the processor on the end user device, from an operating system of the end user device, a permission to access the operating system by a malicious software management application. The method includes receiving, by the processor via the malicious software management application from the operating system, a first set of click information indicative of a set of clicks detected by an input-output interface of the end user device. The method includes receiving, by the processor via the malicious software management application from the operating system, a second set of click information indicative of a set of clicks detected by a web browser of the end user device. The method includes identifying, by the processor via the malicious software management application based on the first set of click information and the second set of click information, a presence of a click generating application on the end user device. The method includes initiating, by the processor via the malicious software management application based on the presence of the click generating application on the end user device, a mitigation action configured to mitigate the presence of the click generating application on the end user device.

In one example, a computer-readable medium stores instructions which, when executed by a processing system, cause the processing system to perform operations. The operations include obtaining, by a malicious software management application on an end user device from an operating system of the end user device, permission to access the operating system. The operations include receiving, by the malicious software management application from the operating system, a first set of click information indicative of a set of clicks detected by an input-output interface of the end user device. The operations include receiving, by the malicious software management application from the operating system, a second set of click information indicative of a set of clicks detected by a web browser of the end user device. The operations include identifying, by the malicious software management application based on the first set of click information and the second set of click information, a presence of a click generating application on the end user device. The operations include initiating, by the malicious software management application based on the presence of the click generating application on the end user device, a mitigation action configured to mitigate the presence of the click generating application on the end user device.

In one example, an end user device includes a processing system including at least one processor and a computer-readable medium storing instructions which, when executed by the processing system, cause the processing system to perform operations. The operations include obtaining, by a malicious software management application on the end user device from an operating system of the end user device, permission to access the operating system. The operations include receiving, by the malicious software management application from the operating system, a first set of click information indicative of a set of clicks detected by an input-output interface of the end user device. The operations include receiving, by the malicious software management application from the operating system, a second set of click information indicative of a set of clicks detected by a web browser of the end user device. The operations include identifying, by the malicious software management application based on the first set of click information and the second set of click information, a presence of a click generating application on the end user device. The operations include initiating, by the malicious software management application based on the presence of the click generating application on the end user device, a mitigation action configured to mitigate the presence of the click generating application on the end user device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes methods, computer-readable media, and apparatuses for detection and mitigation of malicious software running on an end user device. In one example, detection and mitigation of malicious software running on an end user device may be performed for detection and mitigation of malicious click generating software (e.g., ad-click software or other types of malicious click generating software) running in the background of the end user device; however, it will be appreciated that various other types of malicious software running on an end user device may be detected and mitigated based on examples presented herein. In one example, detection of malicious software running on an end user device may be based on an analysis of clicks detected on the end user device (e.g., based on a comparison of physical clicks generated by a user while interacting with a web browser and clicks detected by the web browser) and mitigation of malicious software running on the end user device may include various mitigation actions which may be initiated based on detection of the malicious software running on an end user device (e.g., initiating one or more containment actions for containing the malicious software, initiating a notification to a system or a person, and the like). These and other aspects of the present disclosure are discussed in greater detail below in connection with the examples of FIGS. 1-3.

Figure 1:
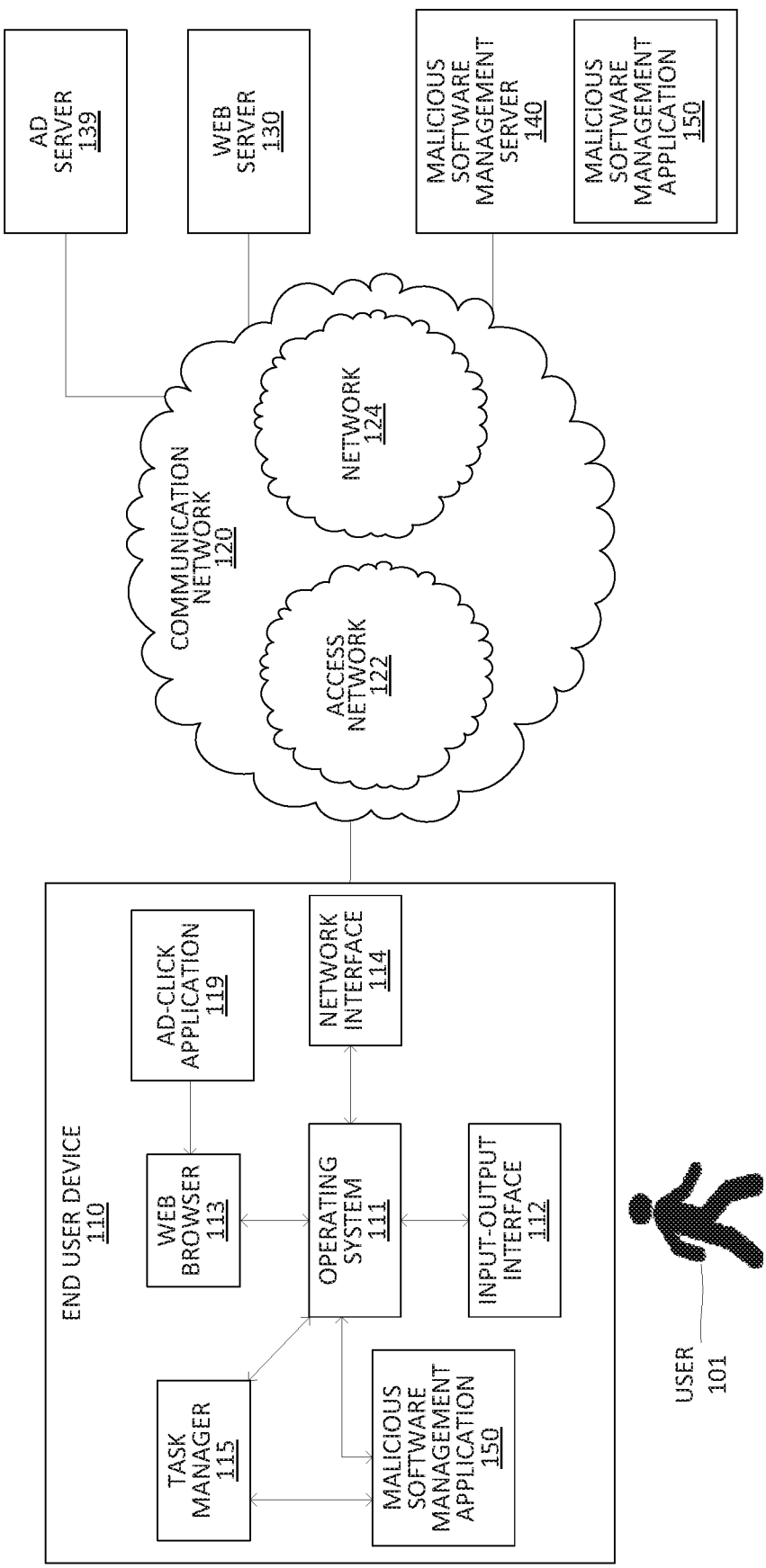
FIG. 1 illustrates an example system including an end user device configured to support detection and mitigation of malicious software running on the end user device.

FIG. 1 illustrates an example system including an end user device configured to support detection and mitigation of malicious software running on the end user device. The system 100 is configured to support detection and mitigation of malicious software running on a device of a user 101. The system 100 includes an end user device (EUD) 110 of the user 101, a communication network (CN) 120, a web server (WS) 130, and a malicious software management server (MSMS) 140. The system 100 also includes an ad server (AS) 139.

The EUD 110 may be any type of end user device which may be used for accessing web content of the WS 130. For example, the EUD 110 may be a smart phone, a tablet computer, a laptop computer, a desktop computer, a smart television, a gaming system, or the like. The EUD 110, as discussed further below, is configured to support various functions to enable detection and mitigation of malicious software (e.g., click generating software, such as ad-click software, or other types of malicious software) on the EUD 110. In one example, the EUD 110 may include a computing device or processing system, such as computing system 300 depicted in FIG. 3, which may be configured to provide one or more operations or functions in connection with examples of the present disclosure for supporting detection and mitigation of malicious software on the EUD 110.

The communication network 120 may include any communication network which may support interaction between end user devices such as the EUD 110 and servers such as the WS 130 and the MSMS 140. The CN 120 may include any number of interconnected networks which may use the same or different communication technologies. For example, the CN 120 may include a traditional circuit switched network (e.g., a public switched telephone network (PSTN)). For example, the CN 120 may include a packet network, such as an Internet Protocol (IP) network (e.g., a Voice over IP (VoIP) network, a Service over IP (SoIP) network, an IP Multimedia Subsystem (IMS) network, or the like), an asynchronous transfer mode (ATM) network, a wireless network (e.g., a cellular network such as a 2G network, a 3G network, a 4G network, a long term evolution (LTE) network, a 5G network, or the like), and so forth. The communication network 120 may include an access network 122 and a network 124.

In one example, the access network 122 may include a broadband cable access network, a broadband optical access network, a Local Area Network (LAN), a wireless access network (e.g., an IEEE 802.11/Wi-Fi network and the like), a cellular access network (e.g., 2G, 3G, 4G, LTE, 5G, and so forth), a Digital Subscriber Line (DSL) network, a PSTN access network, a third-party network, and the like.

In one example, the network 124 may include a telecommunication service provider network, a core network, an enterprise network including infrastructure for computing and providing communications services of a business, an educational institution, a governmental service, or other enterprises. In one example, the network 124 may combine core network components of a cellular network with components of a triple play service network; where triple-play services include telephone services, Internet or data services, and television services to subscribers. For example, the network 124 may functionally include a fixed mobile convergence (FMC) network, e.g., an IMS network. In addition, the network 124 may functionally include a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. In one example, the network 124 may further include a broadcast television network, e.g., a traditional cable provider network or an Internet Protocol Television (IPTV) network, as well as an Internet Service Provider (ISP) network. In one example, the network 124 may include a plurality of television (TV) servers (e.g., a broadcast server, a cable head-end), a plurality of content servers, an advertising server (AS), an interactive TV/video on demand (VoD) server, and so forth.

In one example, the communication network 120 may be operated by a telecommunication network service provider. The operator of the communication network 120 may provide various services to subscribers via the communication network 120. For example, the operator of the communication network 120 may provide a cable television service, an IPTV service, or any other types of telecommunication services to subscribers via the access network 122 and the network 124. It will be appreciated that, although primarily described with respect to examples in which the communication network 120 is operated by a single service provider, the network 124 and the access network 122 may be operated by different service providers, either or both of the network 124 and the access network 122 may be operated by entities having core businesses that are not related to telecommunications services (e.g., corporate, governmental, or educational institution LANs, and the like), and so forth.

The WS 130 is configured to host web content which may be accessed by end user devices such as EUD 110. The WS 130 may host web pages and other web-based resources which may be accessed by end user devices. The WS 130 may receive requests for web content from end user devices and respond to the requests for web content from the end user devices by providing the requested web content to the end user devices.

The AS 139 is configured to enable web publishers and web advertisers to manage online advertising campaigns. The AS 130 may be configured to facilitate display of advertisements on webpages, such as by using a first-party ad server model or a third-party ad server model. The AS 139 may be configured to manage and track advertisements presented via websites, interaction with advertisements via websites (e.g., impressions, clicks, and the like), and so forth. The AS 139 may be configured to count the numbers of clicks on advertisements which are managed by the AS 139. The AS 139 may be configured to perform various other functions.

The MSMS 140 may be configured to support detection and mitigation of malicious software on end user devices such as the EUD 110. The MSMS 140 may be configured to support detection and mitigation of malicious content on end user devices by providing a malicious software management application (MSMA) 150 which may be downloaded to the end user devices and executed on the end user devices to enable detection and mitigation of malicious software on the end user devices. The MSMS 140 may be configured to collect, from instances of the MSMA 150 running on end user devices, feedback related to the operation of the MSMA 150 in detecting and mitigating malicious software on the end user devices, and to use such feedback information to refine future releases of the MSMA 150 that may be made available to end user devices by the MSMS 140. It will be appreciated that the MSMS 140 may be configured to support various other functions related to supporting detection and mitigation of malicious software on end user devices. In one example, the MSMS 140 may include a computing device or processing system, such as computing system 300 depicted in FIG. 3, which may be configured to provide one or more operations or functions in connection with examples of the present disclosure for supporting detection and mitigation of malicious software on end user devices such as the EUD 110.

The EUD 110, as indicated above, is configured to support detection and mitigation of malicious software, such as click generating software (e.g., ad-click software or other types of software which may automatically generate clicks on for other types of content), that is running in the background of the EUD 110. The EUD 110 is configured to support detection and mitigation of click generating software by downloading and running the MSMA 150, which is configured to detect the presence of such click generating software on the EUD 110 (e.g., based on analysis of click information available on the EUD 110) and to mitigate the presence of such click generating software on the EUD 110 (e.g., using one or more containment actions configured to contain the click generating software on the EUD 110, one or more notification actions configured to notify one or more systems or users (e.g., the user 101) of the presence of the click generating software on the EUD 110, and the like).

The EUD 110 includes an operating system (OS) 111, an input-output I/O) interface 112, a web browser (WB) 113, a network interface (NI) 114, and a task manager (TM) 115. The EUD 110 also includes a malicious click generating software (e.g., an ad-click application 119) installed on the EUD 110 without the knowledge of the user 101 of the EUD 110. The EUD 110 also includes an instance of the MSMA 150, which has been downloaded to the EUD 110 from the MSMS 140 by the user 101 of the EUD 110 for purposes of detecting and mitigating malicious software which may be running on the EUD 110 without the knowledge of the user 101 (in this example, the ad-click application 119 which has been surreptitiously installed on the EUD 110 without the knowledge of the user 101 of the EUD 110).

The OS 111 is configured to control various elements of the EUD 110, including the I/O interface 112, the WB 113, the NI 114, the TM 115, the MSMA 150, and so forth. The OS 111 is configured to support communications between various elements of the EUD 110, including the I/O interface 112, the WB 113, the NI 114, the TM 115, the MSMA 150, and so forth. The OS 111 is configured to support operation of the MSMA 150 in detecting and mitigating malicious software running on the EUD 110.

The I/O interface 112 is configured to support various input-output devices which may be associated with the EUD 110 (e.g. input-output devices which may form part of the EUD 110 or otherwise be connected to the EUD 110), which have been omitted for purposes of clarity. For example, input-output devices which may be associated with the EUD 110 may include a mouse, a keyboard, a touchscreen, a microphone, a display, a speaker, a communication interface, and so forth. The I/O interface 112 may receive input signals from the input-output devices associated with the EUD 110 and provide the input signals to the OS 111, may receive output signals from the OS 111 and provide the output signals to the input-output devices associated with the EUD 110, and so forth. The I/O interface 112 may include one or more controllers configured to support control of the various input-output devices which may be associated with the EUD 110 via the I/O interface 112 (e.g., a keyboard controller configured to monitor for signals coming from a keyboard and to forward the signals to the OS 111, a mouse controller configured to monitor for signals from a mouse and to forward the signals to the OS 111, a microphone controller configured to monitor for signals coming from a microphone and to forward the signals to the OS 111, and the like). It will be appreciated that the I/O interface 112 may include various other elements configured to support exchange of signals between elements of the EUD 110 and various input/output device included within or otherwise associated with the EUD 110.

The I/O interface 112 may receive input signals from various input-output devices associated with the EUD 110 and provide the input signals to the OS 111. For example, in the web browsing context, input signals may include signals indicative of keystrokes on a keyboard (e.g., when the user 101 types a web address of a webpage into an interface of the WB 113 to request the webpage from the WS 130), signals indicative of clicks on a mouse (e.g., when the user 101 clicks a link on a webpage displayed via an interface of the WB 113 to request a new web page from the WS 130), signals indicative of touches on a touchscreen (e.g., when the user 101 types a web address into an interface of the WB 113 to request a web page from the WS 130, when the user 101 presses a link on a web page displayed via an interface of the WB 113 to request a new web page from the WS 130), signals indicative of voice commands detected via a microphone (e.g., when the user 101 uses voice control to interact with the WB 113 for navigation or requesting new pages), and so forth.

The I/O interface 112 may receive output signals from the OS 111 and provide the output signals to various input-output devices associated with the EUD 110. For example, in the web browsing context, output signals may include video signals which may be directed to one or more display interfaces of the EUD 110 for presenting a web page accessed by the user 101 via the interface of the WB 113, audio signals which may be directed to one or more speakers of the EUD 110 for playing audio associated with a web page accessed by the user 101 via an interface of the WB 113, and so forth.

The I/O interface 112 may utilize interrupt handlers to act as translators between the hardware components (e.g., the input device and output devices connected through the I/O interface 112) and the OS 111. For example, when a key of a keyboard is pressed by the user 101, the signal may be sent to a keyboard interrupt handler, which tells the CPU about the signal and passes it on the OS 111. It will be appreciated that similar interrupt handlers may be used for facilitating handling and understanding of signals of other input device and output devices which may be connected to the EUD 110 through the I/O interface 112.

The WB 113 is configured to support browsing of web content, such as web content available from WS 130. The WB 113 may detect input signals from various input devices associated with the EUD 110 (e.g., via the I/O interface 112 and the OS 111, where such input signals may be directed to the WB 113 by the OS 111 after the OS 111 receives the input signals from the various input devices associated with the EUD 110) related to presenting web content using the EUD 110, process the input signals from the various input devices associated with the EUD 110 to determine web content to be presented using the EUD 110, and provide output signals to various output device associated with the EUD 110 (e.g., via the OS 111 and the I/O interface 112, where such output signals may be directed to the I/O interface 112 by the OS 111 to provide the output signals to the various out devices associated with the EUD 110) for presenting the web content using the EUD 110. For example, as discussed above, in the web browsing context input signals may include signals indicative of keystrokes on a keyboard (e.g., when the user 101 types a web address of a webpage into an interface of the WB 113 to request the webpage from the WS 130), signals indicative of clicks on a mouse (e.g., when the user 101 clicks a link on a webpage displayed via an interface of the WB 113 to request a new web page from the WS 130), signals indicative of touches on a touchscreen (e.g., when the user 101 types a web address into an interface of the WB 113 to request a web page from the WS 130, when the user 101 presses a link on a web page displayed via an interface of the WB 113 to request a new web page from the WS 130), signals indicative of voice commands detected via a microphone (e.g., when the user 101 uses voice control to interact with the WB 113 for navigation or requesting new pages), and so forth. The WB 113, based on processing of the input signals, can perform various actions for supporting web browsing by the user 101 of the EUD 110, such as obtaining and displaying a webpage, changing a display of a webpage (e.g., scrolling, zooming, and the like), and so forth. As discussed herein, some actions initiated by the WB 113 to support web browsing may be local actions which may be handled locally at the EUD 110, while other actions initiated by the WB 113 to support web browsing may include interaction by the WB 113 with the WS 130 to obtain web content to be presented via the EUD 110. In the case of interaction by the WB 113 with the WS 130 (or other suitable servers) to obtain web content to be presented via the EUD 110, the WB 113 may initiate a network request (e.g., for requesting a web page via entry of a web address or clicking of a link on a web page) to the WS 130 by providing the network request to the OS 111 (e.g., which sends the network request toward the WS 130 via the NI 114) and receive a network response (e.g., a request web page or other web content) from the WS 130 by receiving the network response from the OS 111 (e.g., which receives the network response from the WS 130 via the NI 114). The WB 113 may be configured to support various other functions for supporting web browsing by the user 101 via the EUD 110.

The NI 114 is configured to support communications of the EUD 110 via the CN 120. For example, the NI 114 is configured to support communications between the EUD 110 and the WS 130 for enabling the user 101 of the EUD 110 to interact with web content available from the WS 130, communications between the EUD 110 and the MSMS 140 for enabling the EUD 110 to download the MSMA 150 for use in protecting the EUD 110 from malicious click generating software. The NI 114 may be configured to support various other types of communications of the EUD 110 via the CN 120.

The TM 115 is configured to perform various management functions on the EUD 110. The TM 115 may monitor and track applications which are running on the EUD 110, monitor and track resource utilization of resources of the EUD 110 (e.g., CPU, memory, bandwidth, power, and the like), and so forth. The TM 115 may provide such information to the OS 111 (e.g., periodically, in response to requests, and the like), which may, in turn, make this information available to the MSMA 150 (e.g., periodically, in response to requests, and the like). The TM 115 also or alternatively may provide such information to the MSMA 150 directly (e.g., periodically, in response to requests, and the like), rather than through the OS 111. It will be appreciated that the TM 115 may be configured to perform various other functions on the EUD 110.

The MSMA 150 is configured to detect the presence of malicious software on the EUD 110 and to mitigate the presence of the malicious software on the EUD 110. The MSMA 150 may be configured to interact with the OS 111 (e.g., running on top of the OS 111 or interacting with the OS 111 in any other suitable manner) for purposes of supporting detection and mitigation of malicious software on the EUD 110. The MSMA 150 may be configured to interact with the TM 115 for purposes of supporting detection and mitigation of malicious software on the EUD 110. It will be appreciated that the MSMA 150 may be configured to interact with various other elements of the EUD 110 for purposes of supporting detection and mitigation of malicious software on the EUD 110. It will be appreciated that the MSMA 150, although primarily presented herein as being an application, also or alternatively may be considered to be or may be implemented as a service, a micro-service, a program, and the like.

It will be appreciated that, although EUD 110 is presented as including specific types and arrangements of elements, EUD 110 may include various other types of elements, may include elements which may be arranged in various other ways, and so forth.

The EUD 110, under normal operating conditions, may operate to permit the user 101 of the EUD 110 to access and interact with webpages available from the WS 130. The EUD 110 detects physical inputs of the user 101 (e.g., a mouse click, a keyboard press, a touchscreen tap, and the like) based on interaction of the user 101 with the WB 113 via a presentation interface of the EUD 110. The EUD 110 may interpret the physical inputs of the user 101, based on interaction of the user 101 with the WB 113, to locally control the webpage presented via the WB 113 of the EUD 110 without interacting with the WS 130 (e.g., for scrolling highlighting, zooming, and the like). The EUD 110 may interpret the physical inputs of the user 101, based on interaction of the user 101 with the WB 113, to remotely interact with the WS 130 based on the existing webpage displayed via the WB 113 to cause a new webpage to be displayed via the WB 113 (e.g., for requesting the new webpage via the existing webpage based on the selection of a link to the new webpage from the existing webpage). The interaction of the user 101 of the EUD 110 with webpages available from WS 130, for at least some browsing operations, may be based on "clicks" which may be generated by the user 101 via input devices associated with the EUD 110, detected by the I/O interface 112 and provided to the OS 112, detected by the WB 113, and operated upon by the WB 113 to perform the requested operation. In one example, user operations that are considered to be "clicks" may include clicks which trigger local operations on the EUD 110 (e.g., scrolling, highlighting, zooming, and the like) and also may include clicks which trigger remote operations configured to cause interaction between the EUD 110 and a remote device such as WS 130 (e.g., requesting a new webpage based on clicking of a link). In one example, user operations that are considered to be "clicks" may include clicks which trigger remote operations configured to cause interaction between the EUD 110 and a remote device such as WS 130 (e.g., requesting a new webpage based on clicking of a link) while excluding clicks which trigger local operations on the EUD 110 (e.g., scrolling, highlighting, zooming, and the like). It will be appreciated that, in such example, the "clicks" may be generated in various ways, which may depend on the type of input device being used by the user 101 to interact with the WB 113 (e.g., a typical mouse click operation, pressing of an ENTER key or other suitable key via a keyboard, a tap on a touchscreen, and the like).

The EUD 110, however, in addition to normal operating conditions, may be subject to malicious activity in which malicious click generating software may be downloaded to the EUD 110 without the consent or knowledge of the user. For example, one such type malicious click generating software is so-called "ad-click" software (which, in FIG. 1, is represented by the ad-click application 119). The ad-click software typically is configured to access the WB 113 of the EUD 110 in the background of the EUD 110 (without display of WB 113 to the user 101) and to generate clicks on advertisements on the WB 113 in the background of the EUD 110 as if the user 101 is actually clicking on the advertisements on the WB 113 of the EUD 110. The clicks generated by the ad-click software are detected, and operated upon, by the WB 113 even though the clicks did not originate from the user 101 via the I/O interface 112 of the EUD 110. This causes the EUD 110 to send messages to the remote server(s) associated with the advertisements being "clicked" by the ad-click software on the WB 113 in the background of the EUD 110, without the consent or knowledge of the user 101. For example, this may cause a message to be sent to the AS 139 such that the clicks on the ad are counted by the AS 139 and, thus, may generate revenue. The ad-click software may consume various resources of EUD 110 (e.g., processing resources, memory resources, bandwidth resources, and so forth) and, thus, may negatively impact the experience of the user 101 of the EUD 110. As such, detection and mitigation of such malicious click generating software on the EUD 110, by the MSMA 150 as discussed further below, may provide various benefits.

The MSMA 150 is configured to detect the presence of malicious software on the EUD 110 and to mitigate the presence of the malicious software on the EUD 110. In the example of FIG. 1, the malicious software is the ad-click application 119.

The MSMA 150 is downloaded from the MSMS 140 to the EUD 110 and runs on the EUD 110 to detect and mitigate malicious software on the EUD 110. The MSMA 150 obtains, from the OS 111, permission to access the OS 111 for purposes of supporting detection of malicious software on the EUD 110 (e.g., for receiving information which may be analyzed by the MSMA 150 to monitor for and detect malicious software on the EUD 110) and supporting mitigation of malicious software detected on the EUD 110 (e.g., for enabling the MSMA 150 to initiate one or more mitigation actions based on detection of malicious software on the EUD 110). The permission by the MSMA 150 to access the OS 111 may be in the form of providing the MSMA 150 administrator (admin) privileges on the OS 111 or using other suitable mechanisms for granting the MSMA 150 permission to access the OS 111.

The MSMA 150 is configured to detect the presence of malicious click generating software (e.g., in this example, the ad-click application 119) running on the EUD 110. The MSMA 150 may support detection of malicious click generating software (e.g., the ad-click application 119) running in the background on the EUD 110 based on an analysis of click information related to operation of the WB 113 on the EUD 110.

The MSMA 150 requests, from the OS 111, to receive click information of the I/O interface 112. The MSMA 150, after receiving approval from the OS 111 to receive the click information of the I/O interface 112, receives the click information of the I/O interface 112 from the OS 111 as the OS 111 receives indications of the clicks from the I/O interface 112. The click information of the I/O interface 112, which is received from the OS 111, includes indications of clicks detected by the I/O interface 112 from various input-output device which may be connected to the EUD 110 via the I/O interface 112. For example, these clicks may include mouse clicks on a mouse, keyboard entries on a keyboard, taps on a touchscreen, and the like.

The MSMA 150 requests, from the OS 111, to receive click information of the WB 113. The MSMA 150, after receiving approval from the OS 111 to receive the click information of the WB 113, receives the click information of the WB 113 from the OS 111 as the OS 111 receives indications of the clicks from the WB 113. The click information of the WB 113, which is received from the OS 111, includes clicks detected by the WB 113. As indicated herein, the clicks that are detected by the WB 113 may include (1) legitimate clicks which originate from the I/O interface 112 based on physical user inputs by the user 101 to interact with the WB 113 and (2) illegitimate clicks which are detected by the WB 113 when the ad-click application 119 is maliciously generating advertisement clicks on the WB 113 in the background, but which do not originate from the I/O interface 112 since the ad-click application 119 is operating in the background without any physical user inputs by the user 101. It will be appreciated that, although primarily presented with respect to examples in which the clicks associated with the WB 113 are determined based on detection of the clicks by the WB 113, in at least some examples the clicks associated with the WB 113 may be determined or inferred based on network interactions of the EUD 110 (e.g., where the EUD 110 may send a network request based on a click related to the WB 113, such as a click on a link requesting a web page from WS 130, a click on an advertisement that may be reported to an ad server, and the like).

The MSMA 150 analyzes the click information of the I/O interface 112 and the click information of the WB 113 to determine whether malicious click generating software is running on the EUD 110. The MSMA 150 may analyze the click information of the I/O interface 112 and the click information of the WB 113, to determine whether malicious click generating software is running on the EUD 110, based on comparisons of the click information of the I/O interface 112 and the click information of the WB 113. The comparison of the click information of the I/O interface 112 and the click information of the WB 113, to determine whether malicious click generating software is running on the EUD 110, may be performed in various ways.

In one example, the comparison of the click information of the I/O interface 112 and the click information of the WB 113, to determine whether malicious click generating software is running on the EUD 110, may be performed based on analysis of click volume. For example, within a given time interval (e.g., one minute, five minutes, ten minutes, or the like), the volume of clicks from the I/O interface 112 and the volume of clicks from the WB 113 may be analyzed with respect to a threshold (e.g., to determine whether or not a difference between the volume of clicks from the I/O interface 112 and the volume of clicks from the WB 113 satisfies the threshold).

For example, if a difference between the volume of clicks from the I/O interface 112 and the volume of clicks from the WB 113 satisfies a threshold (e.g., less than the threshold or less than or equal to the threshold), then the MSMA 150 may determine that most or all of the clicks detected by the WB 113 are not the result of any malicious click generating software running on the EUD 110. For example, if the volume of clicks from I/O interface 112 is ten clicks and the volume of clicks from the WB 113 is ten, then the MSMA 150 may determine that each of the clicks detected by the WB 113 originated from the I/O interface 112 and, thus, the clicks detected by the WB 113 are legitimate clicks of the user 101 and, therefore, are not the result of any malicious click generating software running on the EUD 110.

For example, if a difference between the volume of clicks from the I/O interface 112 and the volume of clicks from the WB 113 satisfies a threshold (e.g., greater than the threshold or greater than or equal to the threshold), then the MSMA 150 may determine that at least some of the clicks detected by the WB 113 are the result of malicious click generating software running on the EUD 110. For example, if the volume of clicks from I/O interface 112 is ten clicks and the volume of clicks from the WB 113 is fifty, then the MSMA 150 may determine that a majority of the clicks detected by the WB 113 did not originate from the I/O interface 112 and, thus, that the majority of the clicks detected by the WB 113 are likely to be illegitimate clicks that did not originate from the user 101 and, therefore, are probably the result of malicious click generating software (e.g., the ad-click application 119) running in the background on the EUD 110.

In one example, the comparison of the click information of the I/O interface 112 and the click information of the WB 113, to determine whether malicious click generating software is running on the EUD 110, may be performed based on click matching. For example, each click from the WB 113 may be matched against a corresponding click from the I/O interface 112. Here, a pair of clicks from the WB 113 and the I/O interface 112 may be matched if the two clicks are determined to be contemporaneous with each other (e.g., at the same time, within 10 milliseconds of each other, and the like). If clicks from the WB 113 can be matched with temporally corresponding clicks from the I/O interface 112, then the MSMA 150 may determine that each of the clicks detected by the WB 113 originated from the I/O interface 112 and, thus, the clicks detected by the WB 113 are legitimate clicks of the user 101 and, therefore, are not the result of any malicious click generating software running on the EUD 110. On the other hand, if one or more clicks (e.g., a single click mismatch, a threshold number of click mismatches, and the like) from the WB 113 cannot be matched with temporally corresponding clicks from the I/O interface 112, then the MSMA 150 may determine that the one or more clicks detected by the WB 113 did not originate from the I/O interface 112 and, thus, that the one or more clicks detected by the WB 113 are illegitimate clicks that did not originate from the user 101 and, therefore, are probably the result of malicious click generating software (e.g., the ad-click application 119) running in the background on the EUD 110.

In one example, a mismatch of a single click may be a basis for detection of malicious click generating software (e.g., the ad-click application 119) running in the background on the EUD 110. For example, as long as each click from the WB 113 can be matched with a temporally corresponding click from the I/O interface 112, then the MSMA 150 may determine that each of the clicks detected by the WB 113 originated from the I/O interface 112 and, thus, the clicks detected by the WB 113 are legitimate clicks of the user 101 and, therefore, are not the result of any malicious click generating software running on the EUD 110.

For example, as soon as a click from the WB 113 cannot be matched with a temporally corresponding click from the I/O interface 112, then the MSMA 150 may determine that the click detected by the WB 113 did not originate from the I/O interface 112 and, thus, that the click detected by the WB 113 is an illegitimate click that did not originate from the user 101 and, therefore, is probably the result of a malicious click generating software (e.g., the ad-click application 119) running in the background on the EUD 110.

In one example, a mismatch of a threshold number of clicks (e.g., a single click, two clicks, five clicks, ten clicks and the like) within a given period of time may be a basis for detection of malicious click generating software (e.g., the ad-click application 119) running in the background on the EUD 110.

For example, where the basis for detection of malicious click generating software is three click mismatches within a sliding five minute window then, as long as the each click from the WB 113 can be matched with a temporally corresponding click from the I/O interface 112 such that no more than three clicks from the WB 113 are unable to be temporally matched with corresponding clicks from the I/O interface 112 within the sliding five minute window, then the MSMA 150 may determine that most or all of the clicks detected by the WB 113 originated from the I/O interface 112 and, thus, that most or all of the clicks detected by the WB 113 are legitimate clicks of the user 101 and, therefore, are not the result of any malicious click generating software running on the EUD 110.

For example, where the basis for detection of malicious click generating software is three click mismatches within a sliding five minute window then, as soon as three clicks from the WB 113 cannot be matched with temporally corresponding clicks from the I/O interface 112, then the MSMA 150 may determine that at least some of the click detected by the WB 113 did not originate from the I/O interface 112 and, thus, that at least some of the clicks detected by the WB 113 are illegitimate clicks that did not originate from the user 101 and, therefore, are probably the result of malicious click generating software (e.g., the ad-click application 119) running in the background on the EUD 110.

It will be appreciated that the analysis of the click information of the I/O interface 112 and the click information of the WB 113, to determine whether malicious click generating software is running on the EUD 110, may be performed in various other ways.

The MSMA 150 may support detection of malicious click generating software (e.g., the ad-click application 119) running in the background on the EUD 110 based on monitoring of applications running on the EUD 110. For example, the OS 111, upon determining that there is physical input data from the I/O interface 112 (e.g., from a keyboard, mouse, or other input device) that is indicative of physical input by the user 101, may check to determine whether the physical input data is a system level command or an application level command directed to a particular application (e.g., the WB 113, which may be running for the user 101 on the EUD 110 or which may be used by the ad-click application 119 while running in the background of the EUD 110, or some other application running on the EUD 110, such as a word processing application, email application, or the like). The MSMA 150 may then send the physical input data to the appropriate destination (e.g., to the system in the case of a system level input or to an application for which the input data is intended in the case of an application level input). It will be appreciated that the OS 111 may determine the routing of the input data based on a determination as to which application was active when the physical input took place (e.g., when the key was pressed, the screen was touched, or the like). The MSMA 150, based on interaction with the OS 111, also is able to determine when physical inputs were generated and the applications for which the physical inputs are intended. The MSMA 150 may use such information to detect malicious click generating software (e.g., the ad-click application 119) running in the background on the EUD 110. For example, the MSMA 150 may detect malicious click generating software (e.g., the ad-click application 119) running in the background on the EUD 110 based on a determination that the WB 113 is running, but that none of the physical inputs indicated by the OS 111 from the I/O interface 112 are intended for the WB 113. For example, the MSMA 150 may detect malicious click generating software (e.g., the ad-click application 119) running in the background on the EUD 110 based on a determination that the WB 113 is running, that none of the physical inputs indicated by the OS 111 from the I/O interface 112 are intended for the WB 113, and that there are network interactions via the NI 114 of the EUD 110 (where such network interactions NI 114 may be any network interactions in general or may be network interactions for the WB 113). In at least some such examples, the MSMA 150, based on a determination that one of the applications running on the EUD 110 (e.g., WB 113) does not have any corresponding click information coming from the I/O interface 112 (and, optionally, that the application has network interactions associated therewith or that the EUD 110 has network interactions associated therewith that may be attributed to one of the applications running on the EUD 110) may (1) detect the presence of malicious software (e.g., malicious click generating software, such as the ad-click application 119) running in the background on the EUD 110, or (2) determine that malicious software (e.g., malicious click generating software, such as the ad-click application 119) might be running in the background on the EUD 110 and initiate a system scan (e.g., based on antivirus software or other scanning software) to look for the presence of malicious software (e.g., malicious click generating software, such as the ad-click application 119) running in the background on the EUD 110. It will be appreciated that the MSMA 150 may support detection of malicious click generating software (e.g., the ad-click application 119) running in the background on the EUD 110, based on monitoring of applications running on the EUD 110 and (optionally, system level and/or application level click information and/or system level and/or application level network interaction information), in various other ways.

The MSMA 150 may support detection of malicious click generating software (e.g., the ad-click application 119) running in the background on the EUD 110 based on monitoring of applications running on the EUD 110 and monitoring of click information on the EUD 110 (e.g., click information of the I/O interface 112, click information of the WB 113, and the like). The MSMA 150 may obtain the list of applications running on EUD 110. The MSMA 150 may obtain the list of applications running on EUD 110 from the TM 115 (e.g., directly from the TM 115 based on commands sent to the TM 115 or reporting by the TM 115, indirectly from the OS 111 via commands sent to the OS 111 or reporting by the OS 111, or the like). The MSMA 150 may monitor click information on the EUD 110 and, based on a determination that one of the applications running on the EUD 110 (e.g., WB 113) does not have any corresponding click information coming from the I/O interface 112, may (1) detect the presence of malicious software (e.g., malicious click generating software, such as the ad-click application 119) running in the background on the EUD 110 or (2) determine that malicious software (e.g., malicious click generating software, such as the ad-click application 119) might be running in the background on the EUD 110 and initiate a system scan (e.g., based on antivirus software or other scanning software) to look for the presence of malicious software (e.g., malicious click generating software, such as the ad-click application 119) running in the background on the EUD 110. It will be appreciated that the MSMA 150 may support detection of malicious click generating software (e.g., the ad-click application 119) running in the background on the EUD 110, based on monitoring of applications running on the EUD 110 and monitoring of click information on the EUD 110, in various other ways.

The MSMA 150 may support detection of malicious click generating software (e.g., the ad-click application 119) running in the background on the EUD 110 based on monitoring of applications running on the EUD 110, monitoring of click information on the EUD 110 (e.g., click information of the I/O interface 112), and monitoring of network interaction information on the EUD 110 (e.g., network requests and responses sent via the NI 114 which, for some applications (e.g., WB 113), also may be used to represent or infer corresponding clicks). The MSMA 150 may obtain the list of applications running on EUD 110. The MSMA 150 may obtain the list of applications running on EUD 110 from the TM 115 (e.g., directly from the TM 115 based on commands sent to the TM 115 or reporting by the TM 115, indirectly from the OS 111 via commands sent to the OS 111 or reporting by the OS 111, or the like). The MSMA 150 may monitor, for one or more of the applications identified as running on the EUD 110, click information on the EUD 110 and network interaction information on the EUD 110. The MSMA 150 may, for one of the applications identified as running on the EUD 110, based on a determination (based on the click information) that the application does not have any click information coming from the I/O interface 112 and a determination (based on the network interaction information) that the application does have network activity, (1) detect the presence of malicious software (e.g., malicious click generating software, such as the ad-click application 119) running in the background on the EUD 110, or (2) determine that malicious software (e.g., malicious click generating software, such as the ad-click application 119) might be running in the background on the EUD 110 and initiate a system scan (e.g., based on antivirus software or other scanning software) to look for the presence of malicious software (e.g., malicious click generating software, such as the ad-click application 119) running in the background on the EUD 110. It will be appreciated that the MSMA 150 may support detection of malicious click generating software (e.g., the ad-click application 119) running in the background on the EUD 110, based on monitoring of applications running on the EUD 110, monitoring of click information on the EUD 110 (e.g., click information of the I/O interface 112), and monitoring of network interaction information on the EUD 110 (e.g., network requests and responses sent via the NI 114), in various other ways.

The MSMA 150 may support detection of malicious click generating software (e.g., the ad-click application 119) running in the background on the EUD 110 based on monitoring of applications running on the EUD 110 and monitoring of resource usage levels on the EUD 110 (e.g., resource usage levels of resources of the EUD 110 at the device level of the EUD 110, application-specific resource usage levels of resources of the EUD 110, and the like). The MSMA 150 may obtain the list of applications running on EUD 110. The MSMA 150 may obtain the list of applications running on EUD 110 from the TM 115 (e.g., directly from the TM 115 based on commands sent to the TM 115 or reporting by the TM 115, indirectly from the OS 111 via commands sent to the OS 111 or reporting by the OS 111, or the like). The MSMA 150 may monitor resource usage levels (e.g., CPU, memory, disk, power, and the like) on the EUD 110 and, based on a determination that the resource usage levels deviate from historical resource usage levels for the EUD 110, may (1) detect the presence of malicious software (e.g., malicious click generating software, such as the ad-click application 119) running in the background on the EUD 110, or (2) determine that malicious software (e.g., malicious click generating software, such as the ad-click application 119) might be running in the background on the EUD 110 and initiate a system scan (e.g., based on antivirus software or other scanning software) to look for the presence of malicious software (e.g., malicious click generating software, such as the ad-click application 119) running in the background on the EUD 110. The MSMA 150 may monitor resource usage levels (e.g., CPU, memory, disk, power, and the like) on the EUD 110 and correlate the resource usage levels to the applications determined to be running on the EUD 110 and, based on a determination that the resource usage level for one of the applications deviates from an historical usage level associated with the application (e.g., the WB 113), may (1) detect the presence of malicious software (e.g., malicious click generating software, such as the ad-click application 119) running in the background on the EUD 110 (e.g., causing the higher utilization of resources by the WB 113 due to additional clicks detected and processed by the WB 113), or (2) determine that malicious software (e.g., malicious click generating software, such as the ad-click application 119) might be running in the background on the EUD 110 and initiate a system scan (e.g., based on antivirus software or other scanning software) to look for the presence of malicious software (e.g., malicious click generating software, such as the ad-click application 119) running in the background on the EUD 110. It will be appreciated that the MSMA 150 may support detection of malicious click generating software (e.g., the ad-click application 119) running in the background on the EUD 110, based on monitoring of applications running on the EUD 110 and monitoring of resource usage levels on the EUD 110, in various other ways.

The MSMA 150 may support detection of malicious click generating software (e.g., the ad-click application 119) running in the background on the EUD 110 based on monitoring of applications running on the EUD 110, monitoring of resource usage levels of the applications running on the EUD 110, monitoring of click information on the EUD 110 (e.g., click information of the I/O interface 112, click information of the WB 113, and the like), monitoring of network interaction information on the EUD 110 (e.g., network requests and responses sent via the NI 114), and the like. It will be appreciated that various aspects of use of such information as discussed herein may be combined in various ways to support detection of malicious click generating software (e.g., the ad-click application 119) running in the background on the EUD 110.

The MSMA 150 may support detection of malicious click generating software (e.g., the ad-click application 119) running in the background on the EUD 110 based on monitoring of applications running on the EUD 110, monitoring of resource usage levels of the applications running on the EUD 110, and use of a problem designed to strain the resources of the EUD 110. The MSMA 150 may obtain the list of applications running on EUD 110. The MSMA 150 may obtain the list of applications running on EUD 110 from the TM 115 (e.g., directly from the TM 115 based on commands sent to the TM 115 or reporting by the TM 115, indirectly from the OS 111 via commands sent to the OS 111 or reporting by the OS 111, or the like). The MSMA 150 may initiate a problem to be solved by the EUD 110 (e.g., executed by a CPU of the EUD 110) and may evaluate the handling of the problem by the EUD 110 in order to determine whether malicious click generating software (e.g., the ad-click application 119) is running in the background on the EUD 110. The problem to be solved may be a complex mathematic problem or other type of problem suitable to strain the resources of the EUD 110. The MSMA 150 may evaluate the reaction of the EUD 110 to handling of the problem based on analysis of resource usage information for one or more resource types of the EUD 110 (e.g., CPU, memory, disk, and the like). The MSMA 150 may evaluate the reaction of the EUD 110 to handling of the problem based on comparison of current resource usage during the current handling of the problem by the EUD 110 with historical resource usage information obtained based on past handling of the problem by the EUD 110. The MSMA 150, based on a determination that the current resource usage level of one or more of the resources of the EUD 110 during resolution of the problem by the EUD 110 deviates from the historical average usage level of the one or more of the of the resources of the EUD 110 during resolution of the problem by the EUD 110, may (1) detect the presence of malicious software (e.g., malicious click generating software, such as the ad-click application 119) running in the background on the EUD 110 (e.g., causing the higher utilization of resources by the WB 113 due to additional clicks detected and processed by the WB 113), or (2) determine that malicious software (e.g., malicious click generating software, such as the ad-click application 119) might be running in the background on the EUD 110 and initiate a system scan (e.g., based on antivirus software or other scanning software) to look for the presence of malicious software (e.g., malicious click generating software, such as the ad-click application 119) running in the background on the EUD 110. For example, if the historical average problem solution time is 30 milliseconds when the CPU usage level obtained by the MSMA 150 is 60%, and during a current execution of the problem the problem solution time is determined to be 200 milliseconds while the CPU usage level obtained by the MSMA is 60%, the MSMA 150 may determine that malicious click generating software (e.g., the ad-click application 119) is running in the background on the EUD 110. It will be appreciated that different historical average solution times may be obtained for different CPU usage levels (e.g., the average problem solution time may be less for lower CPU usage and higher for more CPU usage). It will be appreciated that, although primarily presented with respect to use of CPU usage as the basis for detection of malicious click generating software, resource usage for various other types of resources may be used as the basis for detection of malicious click generating software. It will be appreciated that the MSMA 150 may support detection of malicious click generating software (e.g., the ad-click application 119) running in the background on the EUD 110, monitoring of applications running on the EUD 110, monitoring of resource usage levels of the applications running on the EUD 110, and use of a problem designed to strain the resources of the EUD 110, in various other ways.

In one example, at least some applications which may be available on the EUD 110 may be whitelisted (e.g., the user 101 of the EUD 110 may whitelist some known applications or the MSMS 140 may include a list of whitelisted applications in a database embedded in the MSMA 150). In one example, in which the MSMS 140 may include a list of whitelisted applications in a database embedded in the MSMA 150, the database may be collected from various participant users (e.g., user 101 and other users) for application names, running duration, typical resource usage, and so forth). The MSMA 150 will be able to recognize any whitelisted applications when those applications run in the background of the EUD 110. The MSMA 150 may use such information, in combination with actual resources usage levels, to support detection of malicious click generating software (e.g., the ad-click application 119) running in the background on the EUD 110. For example, running of antivirus software in the background of the EUD 110 typically causes resource usage of the EUD 110 (e.g., CPU, memory, and the like) to increase by 30%, the MSMA 150 may be intelligent enough to account for more files to be scanned (e.g., by adjusting the monitoring for the 30% usage level and increasing it accordingly (e.g., via simple linear progression) to get approximate resource usage.

It will be appreciated that the MSMA 150 may support detection of malicious click generating software (e.g., the ad-click application 119) running in the background on the EUD 110 using various combinations of such information available on the EUD 110, using various other types of information available on the EUD 110, and the like.

The MSMA 150 is configured to support mitigation of malicious click generating software (e.g., in this example, the ad-click application 119) running on the EUD 110. The MSMA 150 may support mitigation of the ad-click application 119 based on use of various mitigation actions which may be initiated based on detection that the ad-click application 119 is running on the EUD 110.

In one example, the mitigation action may include an action for containing the malicious click generating software on the EUD 110. In one example, the action for containing the malicious click generating software on the EUD 110 may include one or more of deactivating the ad-click application 119, blocking requests from the ad-click application 119, blocking actions initiated based on detection of requests from the ad-click application 119, and the like.

In one example, the mitigation action may include one or more notification actions. In one example, the notification action may include initiating a notification for notifying the user 101 of the EUD 110 of the presence of the malicious click generating software on the EUD 110 (e.g., causing display of a warning message on a display interface of the EUD 110, sending a message to the user 101 which may be accessed by the user 101 on the EUD 110 or one or more other devices of the user 101, and the like). In one example, the notification action may include initiating a notification for notifying a system administrator, of a system with which the EUD 110 is associated, of the presence of the malicious click generating software on the EUD 110 (e.g., an enterprise system administrator where the EUD 110 is owned by the enterprise or is using the enterprise system, a school system administrator where the EUD 110 is owned by the school or is using the school system, and the like). In one example, the notification action may include initiating a notification for notifying a communication service provider (e.g., an Internet Service Provider (ISP), a core network provider, and the like), which the EUD 110 is associated, of the presence of the malicious click generating software on the EUD 110 (e.g., to enable communication service providers to prevent fraudulent activity on their networks). In one example, the notification action may include initiating a notification for notifying the MSMS 140 of the presence of the malicious click generating software on the EUD 110. It will be appreciated that such notifications may include phone calls, emails, text messages, and the like. It will be appreciated that various other notifications may be initiated to mitigate the presence of the malicious click generating software on the EUD 110.

In one example, the mitigation action may include a reporting action for reporting the presence of the malicious click generating software on the EUD 110 to the owner of the advertisement on which the malicious click generating software on the EUD 110 was operating. In one example, upon detection of the malicious click generating software on the EUD 110, the MSMA 150 may identify the owner of the advertisement, obtain contact information for the owner of the advertisement (e.g., a phone number, an email address, a website address, and the like), and report the activity of the malicious click generating software on the EUD 110 to the owner of the advertisement using the contact information for the owner of the advertisement. In one example, the MSMA 150 may identify the owner of the advertisement and obtain the contact information for the owner of the advertisement using one or more of image processing (e.g., capturing an image of the advertisement and using image processing on the image to determine the contact information for the owner of the advertisement), artificial intelligence (e.g., using artificial intelligence to obtain information from the advertisement and to use the information obtained from the advertisement to search the web for the contact information for the owner of the advertisement), and so forth. In one example, the owner of the advertisement may verify that the application or entity that is hosting the advertisement accepts communications of the MSMA 150 (or the MSMS 140 where the notification is first provided from the MSMA 150 to the MSMS 140 for further reporting by the MSMS 140) in order to spend money with the application or entity hosting the advertisement in order to have the advertisement hosted by the application or entity hosting the advertisement). It will be appreciated that the reporting action for reporting the presence of the malicious click generating software on the EUD 110 to the owner of the advertisement may be performed in various other ways.

It will be appreciated that various other mitigation actions may be initiated, based on detection that malicious click generating software is running on the EUD 110, for mitigating the effects of the malicious click generating software on the EUD 110.

The MSMS 140 and the MSMA 150 may be configured to support refinement of the MSMA 150. It will be appreciated that, although primarily presented with respect to use of the instance of MSMA 150 running on the EUD 110 to support refinement of the MSMA 150 that is made available from the MSMS 140, feedback from various other instances of the MSMA 150 that may be running on various other end user devices (omitted for purposes of clarity) also may be used to support refinement of the MSMA 150 that is made available from the MSMS 140.

The MSMA 150 running on the EUD 110 may be configured to provide, to the MSMS 140, feedback information related to operation of the MSMA 150 on the EUD 110. The feedback information may include information related to the manner in which the MSMA 150 interacts with the OS 111 of the EUD 110, information related to the manner in which the MSMA 150 analyzed click information related to the presence of the ad-click application 119 on the EUD 110, information related to identification of the presence of the ad-click application 119 on the EUD 110, information related to mitigation of the presence of the ad-click application 119 on the EUD 110, information describing the ad-click application 119 on the EUD 110 (e.g., information which may be used to refine and improve the operation of the MSMA 150 in identifying malicious click generating software on end user devices in the future), and so forth.

The MSMS 140 may be configured to receive, from the MSMA 150 running on the EUD 110, the feedback information related to operation of the MSMA 150 on the EUD 110 and to produce, based on the feedback information related to operation of the MSMA 150 on the EUD 110 (as well as similar feedback information from other end user devices running instances of the MSMA 150 that is available from the MSMS 140), an updated version of the MSMA 150. The MSMS 140 may be configured to make the updated version of the MSMA 150 available for download to the EUD 110 (as well as to other end user devices).

It will be appreciated that the MSMS 140 and the MSMA 150 may be configured to provide various other functions for support refinement of the MSMA 150 by the MSMS 140. It will also be appreciated that the EUD 110 and the MSMS 140 may support various other functions for supporting detection and mitigation of malicious click generating software on the EUD 110 (and, in the case of MSMS 140, on various other end user devices).

It should be noted that the system 100 has been simplified. In other words, the system 100 may be implemented in a different form than that illustrated in FIG. 1. For example, the system 100 may be expanded to include additional networks, such as a network operations center (NOC) network, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. Thus, these and other modifications of the system 100 are all contemplated within the scope of the present disclosure.

Figure 2:
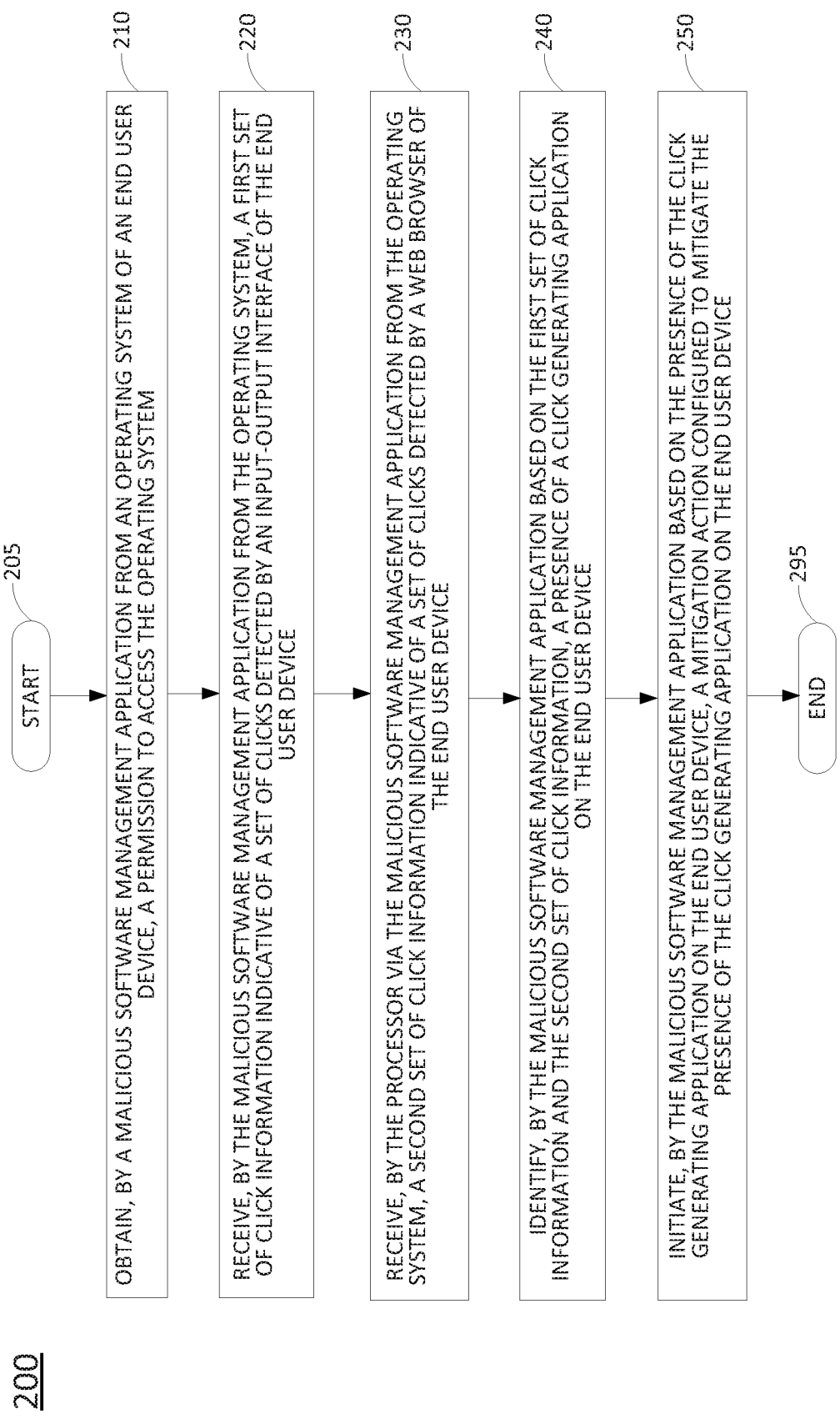
FIG. 2 illustrates a flowchart of an example method for supporting detection and mitigation of malicious software running on an end user device.

FIG. 2 illustrates a flowchart of an example method 200 for supporting detection and mitigation of malicious software running on an end user device. In one example, the method 200 is performed by an end user device (e.g., the EUD 110 of FIG. 1) or by one or more components thereof (e.g., a processor, or processors, performing operations stored in and loaded from a memory). In one example, the method 200 is performed by a malicious software management application running on an end user device (e.g., the EUD 110 of FIG. 1) or by one or more components thereof (e.g., a processor, or processors, performing operations stored in and loaded from a memory). In one example, the method is performed by a processor of the end user device via the malicious software management application. In one example, the steps, functions, or operations of method 200 may be performed by a computing device or processing system, such as computing system 300 and/or hardware processor element 302 as presented in connection with FIG. 3. For instance, the computing system 300 may represent any one or more components of the system 100 that is/are configured to perform the steps, functions and/or operations of the method 200. Similarly, in one example, the steps, functions, or operations of method 200 may be performed by a processing system including one or more computing devices collectively configured to perform various steps, functions, and/or operations of the method 200. For instance, multiple instances of the computing system 200 may collectively function as a processing system. The method 200 begins in step 205 and proceeds to step 210.

At step 210, obtain, by a malicious software management application from an operating system of an end user device, a permission to access the operating system. In one example, the malicious software management application is downloaded by the end user device from a server via a network.

At step 220, receive, by the malicious software management application from the operating system, a first set of click information indicative of a set of clicks detected by an input-output interface of the end user device. In one example, the malicious software management application receives the first set of click information based on a request by the malicious software management application to the operating system for permission to receive, from the operating system, click information of the input-output interface.

At step 230, receive, by the malicious software management application from the operating system, a second set of click information indicative of a set of clicks detected by a web browser of the end user device. In one example, the malicious software management application receives the second set of click information based on a request by the malicious software management application to the operating system for permission to receive, from the operating system, click information of the web browser.

At step 240, identify, by the malicious software management application based on the first set of click information and the second set of click information, a presence of a click generating application on the end user device. In one example, the identifying of the presence of the click generating application on the end user device is based on a comparison of the set of clicks detected by the input-output interface and the set of clicks detected by the web browser. In one example, the identifying of the presence of the click generating application on the end user device is based on an identification of a mismatch between the set of clicks detected by the input-output interface and the set of clicks detected by the web browser. In one example, the mismatch between the set of clicks detected by the input-output interface and the set of clicks detected by the web browser comprises at least one of a volume based mismatch or a temporal mismatch. In one example, the identifying of the presence of the click generating application on the end user device is based on a determination that a threshold number of clicks from the set of clicks detected by the web browser do not have matching clicks from the set of clicks detected by the input-output interface. In one example, the first set of click information comprises a volume of clicks detected by the input-output interface and the second set of click information comprises a volume of clicks detected by the web browser. In one example, the identifying of the presence of the click generating application on the end user device is based on a determination that the volume of clicks detected by the web browser is greater than the volume of clicks detected by the input-output interface by a threshold amount. In one example, the first set of click information comprises a volume of clicks detected by the input-output interface and the second set of click information comprises a volume of network requests initiated by the web browser. In one example, the identifying of the presence of the click generating application on the end user device is based on a determination that the volume of network requests initiated by the web browser is greater than the volume of clicks detected by the input-output interface by a threshold amount. In one example, the identifying of the presence of the click generating application on the end user device is based on a set of information from a task manager of the user device. In one example, the set of information from the task manager of the user device comprises at least one of a list of applications active on the end user device and a set of resource usage information indicative of usage of one or more types of resources of the end user device.

At step 250, initiate, by the malicious software management application based on the presence of the click generating application on the end user device, a mitigation action configured to mitigate the presence of the click generating application on the end user device. In one example, the mitigation action configured to mitigate the presence of the click generating application on the end user device includes a containment action configured to contain operation of the click generating application on the end user device. In one example, the containment action includes at least one of a blocking action configured to block access by the click generating application to the browser and a deactivation action configured to deactivate the click generating application from running on the end user device. In one example, the mitigation action configured to mitigate the presence of the click generating application on the end user device includes a notification action configured to notify a user of the end user device of the presence of the click generating application on the end user device. Following step 250, the method 200 proceeds to step 295 where the method 200 ends.

It is noted that the method 200 may be expanded to include additional steps, or may be modified to replace steps with different steps, to combine steps, to omit steps, to perform steps in a different order, and so forth. It will be appreciated that these and other modifications are all contemplated within the scope of the present disclosure.

It is further noted that, although not expressly specified above, one or more steps of the method 200 may include a storing, displaying, and/or outputting steps as required for a particular application. In other words, any data, records, fields, and/or intermediate results discussed in the method can be stored, displayed, and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Thus, the use of the term "optional step" is intended to only reflect different variations of a particular illustrative example and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

It will be appreciated that various examples presented herein for supporting detection and mitigation of malicious software may provide various advantages or potential advantages. For example, various examples presented herein for supporting detection and mitigation of malicious software may support automated detection and mitigation of malicious software (e.g., click generating software, such as ad-click software, or other suitable types of malicious software) on an end user device, thereby protecting the end user device, improving the operation of the end user device (which also may improve the experience of the user using the end user device), and so forth. It will be appreciated that various examples presented herein for supporting detection and mitigation of malicious software may provide various other advantages or potential advantages.

It will be appreciated that, as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 3 and discussed below) or multiple computing devices collectively configured to perform various steps, functions, and/or operations in accordance with the present disclosure.

Figure 3:
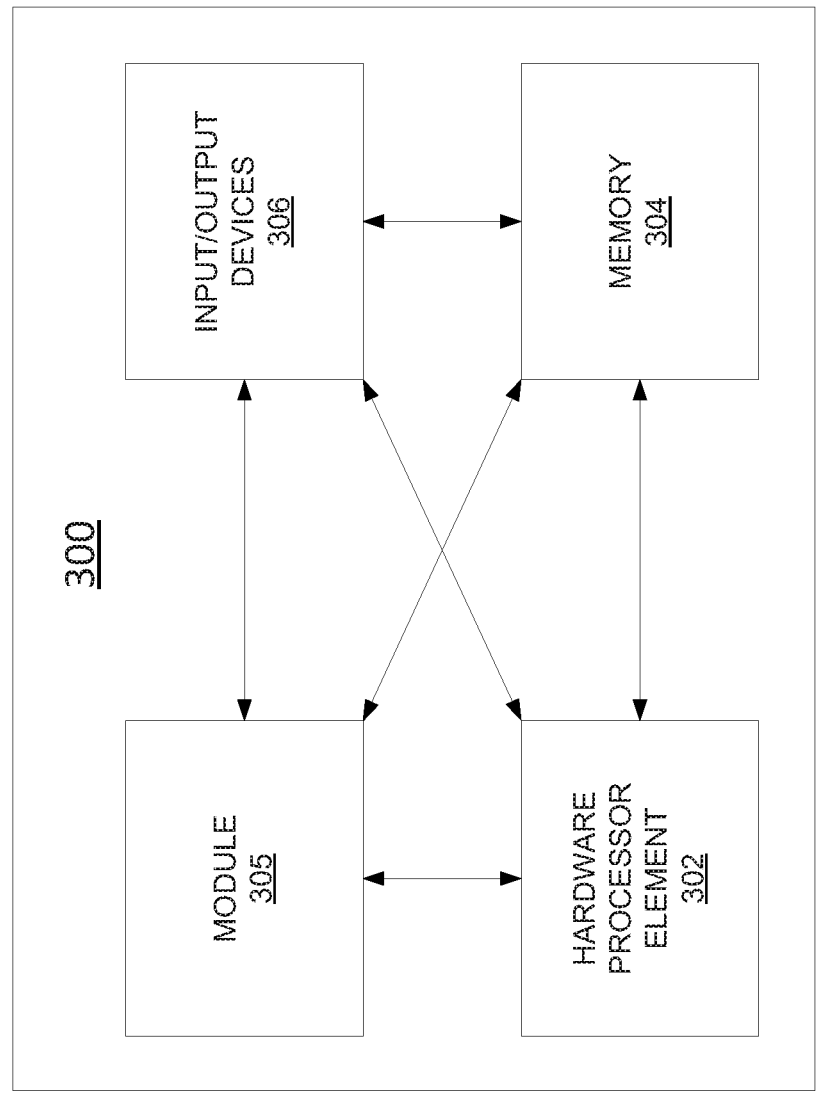
FIG. 3 illustrates a high level block diagram of a computing system specifically programmed to perform the steps, functions, blocks and/or operations described herein.

FIG. 3 depicts a high-level block diagram of a computing system 300 (e.g., a computing device or processing system) specifically programmed to perform the functions described herein. For example, any one or more components or devices illustrated in FIG. 1 or described in connection with the method 200 of FIG. 2, may be implemented as the computing system 300. As depicted in FIG. 3, the computing system 300 comprises a hardware processor element 302 (e.g., comprising one or more hardware processors, which may include one or more microprocessor(s), one or more central processing units (CPUs), and/or the like, where the hardware processor element 302 may also represent one example of a "processing system" as referred to herein), a memory 304, (e.g., random access memory (RAM), read only memory (ROM), a disk drive, an optical drive, a magnetic drive, and/or a Universal Serial Bus (USB) drive), a module 305 for supporting detection and mitigation of malicious software, and one or more input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It will be appreciated that, although only one hardware processor element 302 is shown, the computing system 300 may employ a plurality of hardware processor elements. Furthermore, although only one computing device is shown in FIG. 3, if the method(s) as discussed above is implemented in a distributed or parallel manner for a particular illustrative example, e.g., the steps of the above method(s) or the entire method(s) are implemented across multiple or parallel computing devices, then the computing system 300 of FIG. 3 may represent each of those multiple or parallel computing devices. Furthermore, one or more hardware processor elements (e.g., hardware processor element 302) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 302 can also be configured or programmed to cause other devices to perform one or more operations as discussed above. In other words, the hardware processor element 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the module 305 for supporting detection and mitigation of malicious software (e.g., a software program comprising computer-executable instructions) can be loaded into memory 304 and executed by hardware processor element 302 to implement the steps, functions or operations as discussed above in connection with the example method 200. Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 302) executing the computer-readable instructions relating to the above described method(s) can be perceived as a programmed processor or a specialized processor. As such, the module 305 for supporting detection and mitigation of malicious software (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
obtaining, by a processor on an end user device, from an operating system of the end user device, a permission to access the operating system by a malicious software management application;
receiving, by the processor via the malicious software management application from the operating system, a first set of click information indicative of a set of clicks detected by an input-output interface of the end user device;
receiving, by the processor via the malicious software management application from the operating system, a second set of click information indicative of a set of clicks detected by a web browser of the end user device;
identifying, by the processor via the malicious software management application based on the first set of click information and the second set of click information, a presence of a click generating application on the end user device; and
initiating, by the processor via the malicious software management application based on the presence of the click generating application on the end user device, a mitigation action configured to mitigate the presence of the click generating application on the end user device.

2. The method of claim 1, wherein the malicious software management application is downloaded by the end user device from a server via a network.

3. The method of claim 1, wherein the malicious software management application receives the first set of click information based on a request by the malicious software management application to the operating system for permission to receive, from the operating system, click information of the input-output interface.

4. The method of claim 1, wherein the malicious software management application receives the second set of click information based on a request by the malicious software management application to the operating system for permission to receive, from the operating system, click information of the web browser.

5. The method of claim 1, wherein the identifying of the presence of the click generating application on the end user device is based on a comparison of the set of clicks detected by the input-output interface and the set of clicks detected by the web browser.

6. The method of claim 1, wherein the identifying of the presence of the click generating application on the end user device is based on an identification of a mismatch between the set of clicks detected by the input-output interface and the set of clicks detected by the web browser.

7. The method of claim 6, wherein the mismatch between the set of clicks detected by the input-output interface and the set of clicks detected by the web browser comprises at least one of: a volume based mismatch or a temporal mismatch.

8. The method of claim 6, wherein the identifying of the presence of the click generating application on the end user device is based on a determination that a threshold number of clicks from the set of clicks detected by the web browser does not have matching clicks from the set of clicks detected by the input-output interface.

9. The method of claim 1, wherein the first set of click information comprises a volume of clicks detected by the input-output interface and the second set of click information comprises a volume of clicks detected by the web browser.

10. The method of claim 9, wherein the identifying of the presence of the click generating application on the end user device is based on a determination that the volume of clicks detected by the web browser is greater than the volume of clicks detected by the input-output interface by a threshold amount.

11. The method of claim 1, wherein the first set of click information comprises a volume of clicks detected by the input-output interface and the second set of click information comprises a volume of network requests initiated by the web browser.

12. The method of claim 11, wherein the identifying of the presence of the click generating application on the end user device is based on a determination that the volume of network requests initiated by the web browser is greater than the volume of clicks detected by the input-output interface by a threshold amount.

13. The method of claim 1, wherein the identifying of the presence of the click generating application on the end user device is based on a set of information from a task manager of the end user device.

14. The method of claim 13, wherein the set of information from the task manager of the end user device comprises at least one of: a list of applications active on the end user device and a set of resource usage information indicative of usage of one or more resource types of the end user device.

15. The method of claim 1, wherein the mitigation action configured to mitigate the presence of the click generating application on the end user device comprises at least one of: a containment action configured to contain operation of the click generating application on the end user device, a blocking action configured to block access by the click generating application to the web browser, a deactivation action configured to deactivate the click generating application from running on the end user device, or a notification action configured to notify a user of the end user device of the presence of the click generating application on the end user device.

16. The method of claim 1, further comprising:
sending, by the processor via the malicious software management application toward a server, feedback information related to an identification of the presence of the click generating application on the end user device.

17. The method of claim 16, further comprising:
receiving, by the processor via the malicious software management application from the server, an updated version of the malicious software management application that is based at least in part on the feedback information related to the identification of the presence of the click generating application on the end user device.

18. The method of claim 1, wherein the click generating application comprises an ad-click application configured to generate ad clicks on the web browser while running in a background of the end user device.

19. A non-transitory computer-readable medium storing instructions which, when executed by a processing system of an end user device, cause the processing system to perform operations, the operations comprising:
obtaining, by a malicious software management application from an operating system of the end user device, a permission to access the operating system;
receiving, by the malicious software management application from the operating system, a first set of click information indicative of a set of clicks detected by an input-output interface of the end user device;
receiving, by the malicious software management application from the operating system, a second set of click information indicative of a set of clicks detected by a web browser of the end user device;
identifying, by the malicious software management application based on the first set of click information and the second set of click information, a presence of a click generating application on the end user device; and
initiating, by the malicious software management application based on the presence of the click generating application on the end user device, a mitigation action configured to mitigate the presence of the click generating application on the end user device.

20. An end user device comprising:
a processing system including at least one processor; and
a computer-readable medium storing instructions which, when executed by the processing system, cause the processing system to perform operations, the operations comprising:
obtaining, by a malicious software management application from an operating system of the end user device, a permission to access the operating system;
receiving, by the malicious software management application from the operating system, a first set of click information indicative of a set of clicks detected by an input-output interface of the end user device;
receiving, by the malicious software management application from the operating system, a second set of click information indicative of a set of clicks detected by a web browser of the end user device;
identifying, by the malicious software management application based on the first set of click information and the second set of click information, a presence of a click generating application on the end user device; and
initiating, by the malicious software management application based on the presence of the click generating application on the end user device, a mitigation action configured to mitigate the presence of the click generating application on the end user device.

* * * * *